(12) United States Patent
Stracke

(10) Patent No.: US 9,214,155 B2
(45) Date of Patent: Dec. 15, 2015

(54) HANDSFREE DEVICE WITH COUNTINUOUS KEYWORD RECOGNITION

(71) Applicant: Google Inc., Mountain View, CA (US)

(72) Inventor: John Richard Stracke, Chelmsford, MA (US)

(73) Assignee: Google Inc., Mountain View, CA (US)

( * ) Notice: Subject to any disclaimer, the term of this patent is extended or adjusted under 35 U.S.C. 154(b) by 269 days.

(21) Appl. No.: 13/889,502

(22) Filed: May 8, 2013

(65) Prior Publication Data

US 2014/0095163 A1    Apr. 3, 2014

Related U.S. Application Data

(63) Continuation of application No. 13/632,723, filed on Oct. 1, 2012, now Pat. No. 8,468,023.

(51) Int. Cl.
*G10L 15/00* (2013.01)
*G10L 15/08* (2006.01)
*G06F 3/16* (2006.01)
*H04R 1/10* (2006.01)
*H04M 1/60* (2006.01)
*G10L 15/30* (2013.01)

(52) U.S. Cl.
CPC .............. *G10L 15/08* (2013.01); *G06F 3/167* (2013.01); *G10L 15/30* (2013.01); *H04M 1/6066* (2013.01); *H04R 1/1091* (2013.01); *G10L 2015/088* (2013.01); *H04M 2250/02* (2013.01); *H04M 2250/74* (2013.01); *H04R 2201/107* (2013.01); *H04R 2201/109* (2013.01); *H04R 2420/07* (2013.01)

(58) Field of Classification Search
CPC ................. H04M 2250/02; H04M 2250/74; G10L 15/22; G10L 15/32
USPC ........................................ 704/275
See application file for complete search history.

(56) References Cited

U.S. PATENT DOCUMENTS 6,006,185 A    12/1999   Immarco
6,023,676 A    2/2000    Erell
(Continued)

OTHER PUBLICATIONS

Notification of Transmittal of the International Search Report and the Written Opinion of the International Searching Authority, or the Declaration issued in PCT/US2013/060690 on Jan. 3, 2014, 11 pages.

(Continued)

*Primary Examiner* — Daniel Abebe
(74) *Attorney, Agent, or Firm* — Fish & Richardson P.C.

(57) ABSTRACT

A handsfree device, which is coupled to a data processing device, may be operable to monitor at least one audio stream for occurrence of at least one keyword. Upon recognition of the at least one keyword, the handsfree device may establish a first connection between the handsfree device and the data processing device for launching a voice interface in the data processing device. The handsfree device may send audio data received after the recognition of the at least one keyword to the data processing device, via the first connection for responding to the audio data via the voice interface. During a keyword configuration operation, the handsfree device may send at least one inputted keyword to the data processing device for recording. The handsfree device may receive, via a second connection, the recorded at least one keyword from the data processing device for keyword configuration of the handsfree device.

20 Claims, 8 Drawing Sheets

(56) References Cited

U.S. PATENT DOCUMENTS

| | | |
|---|---|---|
| 7,542,787 B2 | 6/2009 | Zhang et al. |
| 7,650,168 B2 | 1/2010 | Bailey |
| 8,150,700 B2 | 4/2012 | Shin et al. |
| 8,260,618 B2 | 9/2012 | Mahlbacher |
| 2004/0242278 A1 | 12/2004 | Tomoda et al. |
| 2008/0037727 A1 | 2/2008 | Sivertsen et al. |
| 2008/0059193 A1 | 3/2008 | Huang et al. |
| 2009/0204409 A1 | 8/2009 | Mozer |
| 2009/0204410 A1* | 8/2009 | Mozer et al. .................. 704/275 |
| 2010/0041447 A1 | 2/2010 | Graylin |
| 2010/0105435 A1 | 4/2010 | Ueda et al. |
| 2010/0235168 A1* | 9/2010 | Murawski et al. ............ 704/231 |
| 2010/0304783 A1* | 12/2010 | Logan et al. ................ 455/552.1 |
| 2011/0107415 A1* | 5/2011 | Shen ................................ 726/19 |

OTHER PUBLICATIONS

No Buttons Headset, Truly Hands-Free Bluetooth Cell Phone Headset Great for a quadriplegic, May 28, 2012, 2 pages.

Office Action issued in U.S. Appl. No. 13/632,723 on Dec. 3, 2012, 11 pages.

Notice of Allowance issued in U.S. Appl. No. 13/632,723 on Apr. 5, 2013, 8 pages.

International Preliminary Report on Patentability for International Application No. PCT/US2013/060690, mailed Apr. 16, 2015, 9 pages.

* cited by examiner

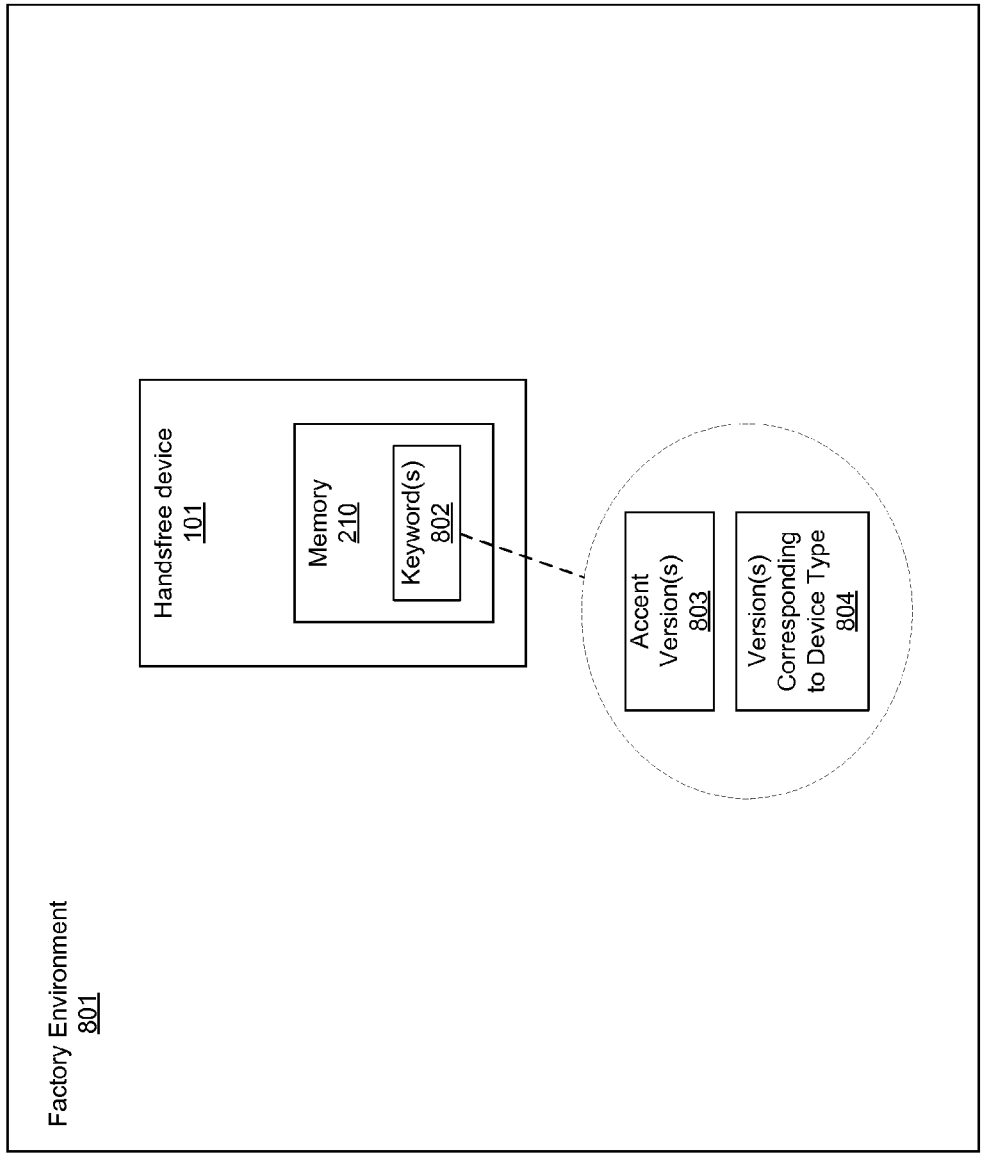

HANDSFREE DEVICE WITH COUNTINUOUS KEYWORD RECOGNITION

CROSS-REFERENCE TO RELATED APPLICATION

This application is a continuation of U.S. application Ser. No. 13/632,723, filed Oct. 1, 2012, the entirety of which is incorporated by reference.

FIELD

Certain embodiments of the disclosure relate to voice recognition and interface systems. More specifically, certain embodiments of the disclosure relate to a method and system for a handsfree device with continuous keyword recognition.

BACKGROUND

A handsfree device such as, for example, a headset may be conventionally used in conjunction with a data processing device. The handsfree device may comprise, for example, a wireless headset which uses one or more of wireless technologies such as, for example, Bluetooth. The data processing device may comprise, for example, a mobile phone, a smart phone, a tablet and/or other devices with voice recognition. The data processing device may comprise voice interface functions. The voice interface functions are capable of recognizing and responding to a user's voice which may be received, for example, from a microphone of the handsfree device. The voice interface of the data processing device may be triggered or invoked, for example, by pressing a button on the data processing device.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

Aspects of the present disclosure are directed to a method and system for a handsfree device with continuous keyword recognition. In various embodiments of the disclosure, a handsfree device, which is coupled or connected to a data processing device and has been configured to recognize at least one keyword, may be operable to monitor at least one received audio stream for occurrence of the at least one keyword. Upon recognition of the at least one keyword, the handsfree device may be operable to establish a first connection between the handsfree device and the data processing device for launching a voice interface in the data processing device. The handsfree device may be operable to send audio data, which may be received after the recognition of the at least one keyword, to the data processing device via the established first connection for responding to the sent audio data, by the data processing device, via the voice interface. In this regard, the audio data to be sent to the data processing device may be buffered in the handsfree device during a time interval corresponding to establishing the first connection.

During a keyword configuration operation, the handsfree device may be operable to input the at least one keyword. The handsfree device may be operable to send the inputted at least one keyword to the data processing device for recording, by the data processing device, of the inputted at least one keyword. The handsfree device may be operable to receive, via a second connection, the recorded at least one keyword from the data processing device. The handsfree device may then be operable to perform configuration of the handsfree device, utilizing the recorded at least one keyword, for recognizing the at least one keyword in the at least one received audio stream.

Various advantages, aspects and novel features of the present disclosure, as well as details of an illustrated embodiment thereof, will be more fully understood from the following description and drawings.

BRIEF DESCRIPTION OF DRAWINGS

FIG. 8 is a block diagram illustrating example scenarios of keyword hard-coded into handsfree device in a factory environment, in accordance with an embodiment of the disclosure.

DETAILED DESCRIPTION

Figure 1:
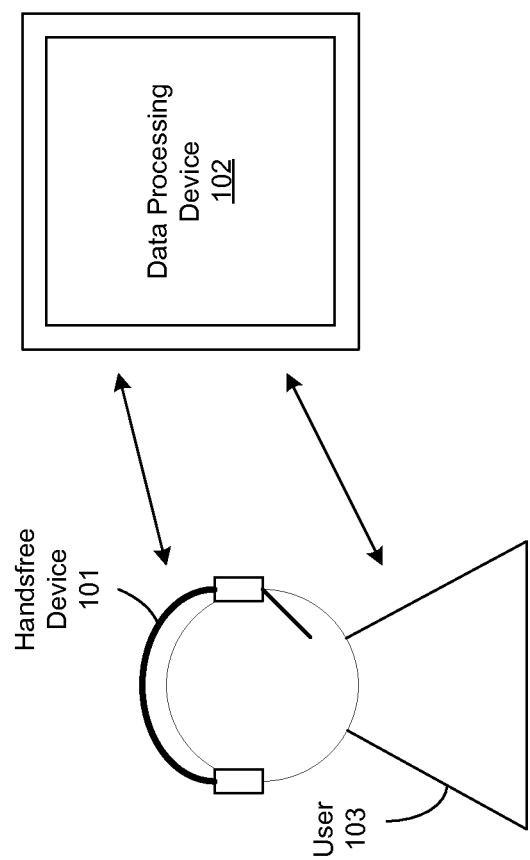
FIG. 1 is a block diagram illustrating an example handsfree device coupled to a data processing device, in accordance with an embodiment of the disclosure.

Certain embodiments of the disclosure can be found in a method and system for a handsfree device with continuous keyword recognition. Certain specific details are set forth in the following description and in drawings to provide a thorough understanding of various embodiments of the disclosure. One skilled in the art, however, will understand that additional embodiments of the present disclosure may be practiced without several of the details described in the following description.

In various embodiments of the disclosure, a handsfree device, which is coupled or connected to a data processing device and has been configured to recognize at least one keyword, may be operable to monitor at least one received audio stream for occurrence of the at least one keyword. Upon recognition of the at least one keyword, the handsfree device may be operable to establish a first connection between the handsfree device and the data processing device for launching a voice interface in the data processing device. The handsfree device may be operable to send audio data, which may be received after the recognition of the at least one keyword, to the data processing device via the established first connection for responding to the sent audio data, by the data processing device, via the voice interface. In this regard, the audio data to be sent to the data processing device may be buffered in the handsfree device during a time interval corresponding to establishing the first connection.

During a keyword configuration operation, the handsfree device may be operable to input the at least one keyword. The handsfree device may be operable to send the inputted at least one keyword to the data processing device for recording, by the data processing device, of the inputted at least one keyword. The handsfree device may be operable to receive, via a second connection, the recorded at least one keyword from the data processing device. The handsfree device may then be operable to perform configuration of the handsfree device, utilizing the recorded at least one keyword, for recognizing the at least one keyword in the at least one received audio stream.

In an example embodiment of the disclosure, the handsfree device may be operable to enter the keyword configuration operation in instances when the data processing device receives a request, and the data processing device causes the handsfree device to enter the keyword configuration operation based on the received request. The handsfree device may also be operable to enter the keyword configuration operation in instances when the handsfree device is first coupled to the data processing device, the data processing device discovers that the handsfree device is capable of monitoring the at least one received audio stream for occurrence of the at least one keyword, the data processing device determines that the handsfree device has not been configured to recognize the at least one keyword, and the data processing device causes the handsfree device to enter the keyword configuration operation by prompting and requesting input of the at least one keyword via the handsfree device. In this regard, in instances when the data processing device determines that the handsfree device has been configured to recognize the at least one keyword, the data processing device may enable a keyword configuration interface to allow recording of the at least one keyword via the keyword configuration operation, without requesting the input of the at least one keyword via the handsfree device.

In an example embodiment of the disclosure, the data processing device may store the recorded at least one keyword to allow reuse of the stored at least one keyword in a subsequent keyword configuration operation. Before sending the recorded at least one keyword to the handsfree device via the second connection for keyword configuration, the data processing device may replay the recorded at least one keyword for review. As a result of the review of the recorded at least one keyword, the data processing device may receive an indication, where the indication may comprise acceptance of the recorded at least one keyword, rejection of the recorded at least one keyword, or cancellation of the keyword configuration operation, for example.

In another example embodiment of the invention, the handsfree device may comprise the at least one keyword which may be hard-coded into the handsfree device in a factory environment. The handsfree device may also comprise at least one accent version of each of the at least one keyword, where the at least one accent version of each of the at least one keyword may be hard-coded into the handsfree device in a factory environment. In such instances, during a keyword configuration operation, at least one new keyword may be allowed to be chosen from among the at least one accent version of each of the at least one keyword. The handsfree device may also comprise at least one version of each of the at least one keyword, where the at least one version of each of the at least one keyword may be hard-coded into the handsfree device in a factory environment, and the at least one version may correspond to at least one device type of the data processing device respectively. In such instances, during a keyword configuration operation, at least one new keyword may be allowed to be chosen from among the at least one version of each of the at least one keyword.

In some embodiments of the disclosure, the handsfree device may comprise a Bluetooth handsfree device. For example, the Bluetooth handsfree device may be a Bluetooth headset. In such instances, the Bluetooth handsfree device, which is coupled or connected to a data processing device via Bluetooth communication and has been configured to recognize at least one keyword, may be operable to monitor at least one received audio stream for occurrence of the at least one keyword. Upon recognition of the at least one keyword, the Bluetooth handsfree device may be operable to establish a first connection between the Bluetooth handsfree device and the data processing device for launching a voice interface in the data processing device. The Bluetooth handsfree device may be operable to send audio data, which may be received after the recognition of the at least one keyword, to the data processing device via the established first connection for responding to the sent audio data, by the data processing device, via the voice interface.

During a keyword configuration operation, the Bluetooth handsfree device may be operable to input the at least one keyword. The Bluetooth handsfree device may be operable to send the inputted at least one keyword to the data processing device for recording, by the data processing device, of the inputted at least one keyword. The Bluetooth handsfree device may be operable to receive, via a second connection, the recorded at least one keyword from the data processing device. The Bluetooth handsfree device may then be operable to perform configuration of the Bluetooth handsfree device, utilizing the recorded at least one keyword, for recognizing the at least one keyword in the at least one received audio stream. In an example embodiment of the disclosure, the Bluetooth handsfree device may be operable to enter the keyword configuration operation in instances when the Bluetooth handsfree device is first coupled to the data processing device, the data processing device discovers that the Bluetooth handsfree device is capable of monitoring the at least one received audio stream for occurrence of the at least one keyword, the data processing device determines that the Bluetooth handsfree device has not been configured to recognize the at least one keyword, and the data processing device causes the Bluetooth handsfree device to enter the keyword configuration operation by prompting and requesting input of the at least one keyword via the Bluetooth handsfree device. In this regard, the data processing device may utilize a Bluetooth service discovery protocol (SDP) to discover that the Bluetooth handsfree device is capable of monitoring the at least one received audio stream for occurrence of the at least one keyword.

FIG. 1 is a block diagram illustrating an example handsfree device coupled to a data processing device, in accordance with an embodiment of the disclosure. Referring to FIG. 1, there is shown a handsfree device 101, a data processing device 102 and a user 103. The handsfree device 101 may be coupled or connected to the data processing device 102 for handsfree operation and the user 103 may wear the handsfree device 101 for the handsfree operation.

The handsfree device 101 may comprise suitable logic, circuitry, interfaces and/or code that may be operable to provide the equivalent handset functionality of a data processing device, such as the data processing device 102, with handsfree operation. In an example embodiment of the disclosure, the handsfree device 101 may be configured to recognize at least one keyword. The handsfree device 101 may be operable to monitor at least one received audio stream for occurrence of the at least one keyword. Upon recognition of the at least one keyword, the handsfree device 101 may be operable to establish a first connection between the handsfree device 101 and the data processing device 102 for launching a voice interface in the data processing device 102. The handsfree device 101 may be operable to send audio data, which may be received after the recognition of the at least one keyword, to the data processing device 102 via the established first connection. The data processing device 102 may then respond to the sent audio data via the voice interface.

The data processing device 102 may comprise suitable logic, circuitry, interfaces and/or code that may be operable to process data or signals. The data processing device may also be operable to communicate signals across one or more wireless communication networks and/or one or more wire-line communication networks, for example. The data processing device 102 may comprise, for example, a mobile phone, a smart phone, a tablet and/or other devices with voice recognition. In an example embodiment of the disclosure, the data processing device 102 may comprise voice interface capability. The voice interface in the data processing device 102 may be launched or triggered, for example, based on some keyword(s) inputted or spoken by the user 103 via the handsfree device 101. The voice interface may then respond to audio data inputted or spoken by the user 103 via the handsfree device 101.

In operation, the handsfree device 101, which is coupled or connected to the data processing device 102, may have been configured to recognize at least one keyword. The handsfree device 101 may be operable to monitor at least one received audio stream for occurrence of the at least one keyword. Upon recognition of the at least one keyword, the handsfree device 101 may be operable to establish a first connection between the handsfree device 101 and the data processing device 102 for launching a voice interface in the data processing device 102. The handsfree device 101 may be operable to send audio data, which may be received after the recognition of the at least one keyword, to the data processing device 102 via the established first connection. The data processing device 102 may then respond to the sent audio data via the voice interface. In this regard, the handsfree device 101 may be operable to buffer the audio data to be sent to the data processing device 102 during a time interval corresponding to establishing the first connection. In such instances, for example, the user 103 may want to dial a phone number. The user 103 may speak a keyword "dial" or "dialing" followed by a phone number. Upon recognition of the keyword (e.g., dial or dialing), the handsfree device 101 may establish the first connection between the handsfree device 101 and the data processing device 102 for launching or triggering the voice interface in the data processing device 102. The handsfree device 101 may transmit the audio data corresponding to the phone number to the data processing device 102 via the established first connection. The audio data corresponding to the phone number may be buffered during the time corresponding to establishing the first connection. In this regard, the time delay for establishing the first connection may be transparent to the user 103. The data processing device 102 may then respond to the audio data corresponding to the phone number, via the voice interface, and dial the phone number on behalf of the user 103.

During a keyword configuration operation for enabling the handsfree device 101 to recognize the at least one keyword, the handsfree device 101 may be operable to send the at least one keyword inputted or spoken by the user 103 to the data processing device 102, and the data processing device 102 may record the at least one keyword inputted by the user 103. The handsfree device 101 may be operable to receive, via a second connection, the recorded at least one keyword from the data processing device 102. The handsfree device 101 may then be operable to perform configuration of the handsfree device 101, utilizing the recorded at least one keyword, for recognizing the at least one keyword in the at least one received audio stream.

In an example embodiment of the disclosure, the handsfree device 101 may be operable to enter the keyword configuration operation in instances when the data processing device 102 receives a request for keyword configuration from the user 103, and the data processing device 102 causes the handsfree device 101 to enter the keyword configuration operation based on the request received from the user 103. For example, the data processing device 102 may cause the handsfree device 101 to enter the keyword configuration operation by commanding or ordering the handsfree device 101 to start sending audio data, such as the at least one keyword, to the data processing device 102. The handsfree device 101 may also be operable to enter the keyword configuration operation in instances when the handsfree device 101 is first coupled or connected to the data processing device 102, the data processing device 102 discovers that the handsfree device 101 is capable of monitoring the at least one received audio stream for occurrence of the at least one keyword, the data processing device 102 determines that the handsfree device 101 has not been configured to recognize the at least one keyword, and the data processing device 102 causes the handsfree device 101 to enter the keyword configuration operation by prompting and requesting the user 103 to input or speak the at least one keyword via the handsfree device 101. In this regard, in instances when the data processing device 102 determines that the handsfree device 101 has already been configured to recognize the at least one keyword, the data processing device 102 may enable a keyword configuration interface to allow the user 103 to record the at least one keyword via the keyword configuration operation, without requesting the user 103 to input or speak the at least one keyword via the handsfree device 101. In such instances, the user 103 may choose to record at least one new keyword, for example, at leisure, via the same keyword configuration operation.

In an example embodiment of the disclosure, the data processing device 102 may store the recorded at least one keyword to allow the user 103 to reuse the stored at least one keyword in a subsequent keyword configuration operation. In such instances, the user 103 may switch back to a previously used keyword without having to record the keyword from scratch. Before sending the recorded at least one keyword to the handsfree device 101 via the second connection for keyword configuration, the data processing device 102 may replay the recorded at least one keyword for the user 103 to review, and as a result of reviewing the recorded at least one keyword by the user 103, the data processing device 102 may receive an indication communicated from the user 103. The indication may comprise, for example, acceptance of the recorded at least one keyword, rejection of the recorded at least one keyword, or cancellation of the keyword configuration operation.

In another example embodiment of the disclosure, the handsfree device 101 may comprise the at least one keyword which may be hard-coded into the handsfree device 101 in a factory environment. The handsfree device 101 may also comprise at least one accent version of each of the at least one keyword, where the at least one accent version of each of the at least one keyword may be hard-coded into the handsfree device 101 in a factory environment. In this regard, during a keyword configuration operation, the user 103 may be allowed to choose, for example, based on an accent of the user 103, at least one new keyword from among the at least one accent version of each of the at least one keyword. For example, the user 103 may choose at least one new keyword that may match his/her accent.

The handsfree device 101 may also comprise at least one version of each of the at least one keyword, where the at least one version of each of the at least one keyword may be hard-coded into the handsfree device 101 in a factory environment, and the at least one version may correspond to at least one device type of the data processing device 102 respectively. In this regard, during a keyword configuration operation, the user 103 may be allowed to choose, for example, based on a device type of the data processing device 102, at least one new keyword from among the at least one version of each of the at least one keyword. For example, in instances when the data processing device 102 is a mobile phone, the user 103 may choose a keyword version which comprises "phone". In instances when the data processing device 102 is a PC or a computer, the user 103 may choose a keyword version which comprises "computer".

Figure 2:
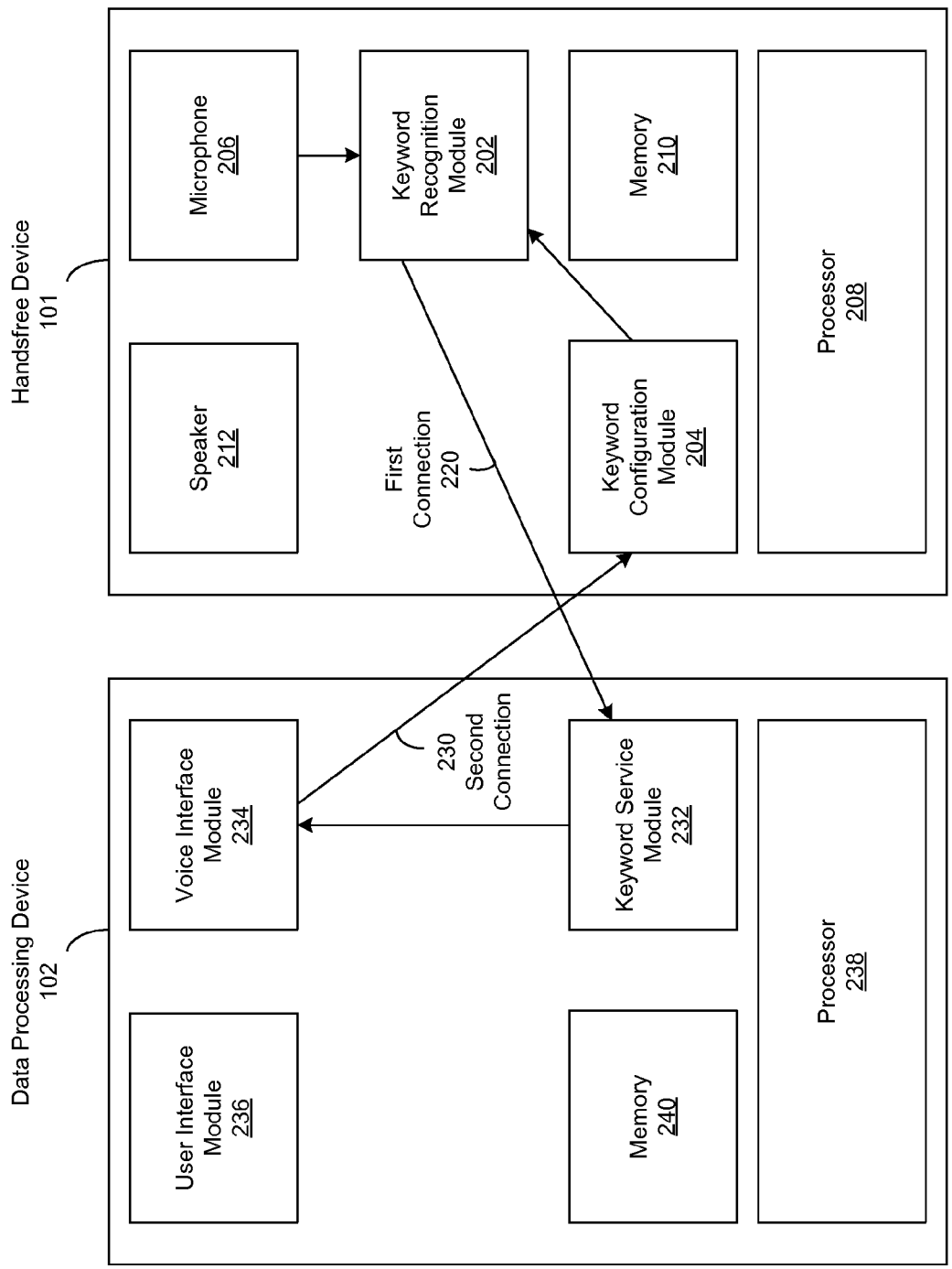
FIG. 2 is a block diagram illustrating an example handsfree device with continuous keyword recognition, in accordance with an embodiment of the disclosure.

FIG. 2 is a block diagram illustrating an example handsfree device with continuous keyword recognition, in accordance with an embodiment of the disclosure. Referring to FIG. 2, there is shown the handsfree device 101 and the data processing device 102. The handsfree device 101 may be coupled or connected to the data processing device 102. The handsfree device 101 may comprise a processor 208, a memory 210, a microphone 206, a speaker 212, a keyword recognition module 202 and a keyword configuration module 204. The data processing device 102 may comprise a processor 238, a memory 240, a voice interface module 234, a user interface module 236 and a keyword service module 232. The handsfree device 101 and the data processing device 102 may be as described with respect to FIG. 1, for example.

The processor 208 in the handsfree device 101 may comprise suitable logic, circuitry, interfaces and/or code that may be operable to manage and/or control operations of various components in the handsfree device 101 such as, for example, the microphone 206, the speaker 212, the keyword recognition module 202, the keyword configuration module 204 and/or other components. The processor 208 may utilize an operating system that enables the execution of various applications. The processor 208 may implement one or more communication protocols for communicating with the data processing device 102, for example.

The memory 210 in the handsfree device 101 may comprise suitable logic, circuitry, interfaces and/or code that may be operable to store information such as executable instructions and/or data that may be utilized by the processor 208, the keyword recognition module 202 and/or the keyword configuration module 204, for example. The memory 210 may comprise RAM, ROM, low latency nonvolatile memory such as flash memory and/or other suitable electronic data storage.

The microphone 206 in the handsfree device 101 may comprise suitable logic, circuitry, interfaces and/or code that may be operable to convert audio waves into electrical signals. The microphone 206, along with the speaker 212, may enable a user such as the user 103 to participate in a voice conversation, to provide audio commands and/or to receive audio feedbacks.

The speaker 212 in the handsfree device 101 may comprise suitable logic, circuitry, interfaces and/or code that may be operable to convert electrical signals into audio waves. The speaker 212, along with the microphone 206, may enable a user such as the user 103 to participate in a voice conversation, to provide audio commands and/or to receive audio feedbacks.

The keyword recognition module 202 in the handsfree device 101 may comprise suitable logic, circuitry, interfaces and/or code that may be operable to provide keyword recognition functions for the handsfree device 101. In an example embodiment of the disclosure, the keyword recognition module 202 may be operable to recognize at least one keyword which may be inputted or spoken by a user such as the user 103 via the microphone 206. Upon recognition of the at least one keyword, the keyword recognition module 202 may be operable to establish a first connection 220 between the keyword recognition module 202 and the keyword service module 232 in the data processing device 102 for voice interface operations. The keyword recognition module 202 may then transmit audio data, which may be received after the recognition of the at least one keyword, to the keyword service module 232, via the established first connection 220, for voice interface operations.

The keyword configuration module 204 in the handsfree device 101 may comprise suitable logic, circuitry, interfaces and/or code that may be operable to provide keyword configuration functions for the handsfree device 101. In an example embodiment of the disclosure, the keyword configuration module 204 may be operable to configure the keyword recognition module 202 with at least one keyword.

The processor 238 in the data processing device 102 may comprise suitable logic, circuitry, interfaces and/or code that may be operable to manage and/or control operations of various components in the data processing device 102 such as, for example, the voice interface module 234, the user interface module 236, the keyword service module 232 and/or other components. The processor 238 may utilize an operating system that enables the execution of various applications. The processor 238 may implement one or more communication protocols for communicating with the handsfree device 101, for example.

The memory 240 in the data processing device 102 may comprise suitable logic, circuitry, interfaces and/or code that may be operable to store information such as executable instructions and/or data that may be utilized by the processor 238, the voice interface module 234, the user interface module 236 and/or the keyword service module 232, for example. The memory 240 may comprise RAM, ROM, low latency nonvolatile memory such as flash memory and/or other suitable electronic data storage.

The voice interface module 234 in the data processing device 102 may comprise suitable logic, circuitry, interfaces and/or code that may be operable to provide voice interface functions for the data processing device 102. In an example embodiment of the disclosure, the voice interface module 234 may be activated or launched by the keyword service module 232 for voice interface operations, based on at least one keyword communicated from the handsfree device 101. During a keyword configuration operation in the handsfree device 101, the voice interface module 234 may be operable to record at least one keyword which may be received form a user such as the user 103 via the handsfree device 101. The voice interface module 234 may be operable to send or transmit the recorded at least one keyword to the keyword configuration module 204 in the handsfree device 101, via a second connection 230. The keyword configuration module 204 may then perform configuration of the keyword recognition module 202 utilizing the recorded at least one keyword.

The user interface module 236 in the data processing device 102 may comprise suitable logic, circuitry, interfaces and/or code that may be operable to provide user interface functions for the data processing device 102. During a keyword configuration operation in the handsfree device 101, the user interface module 236 may be operable to receive one or more requests for keyword configuration, from a user such as the user 103.

The keyword service module 232 in the data processing device 102 may comprise suitable logic, circuitry, interfaces and/or code that may be operable to launch or trigger the voice interface module 234 for voice interface operations. In an example embodiment of the disclosure, the keyword service module 232 may be operable to launch the voice interface module 234 in instances when the first connection 220 is established between the keyword service module 232 and the keyword recognition module 202 in the handsfree device 101. The keyword service module 232 may then be operable to pass audio data received via the first connection 220 to the voice interface module 234 for voice interface operations.

In operation, the keyword recognition module 202 in the handsfree device 101 may have been configured to recognize at least one keyword. The keyword recognition module 202 may be operable to monitor at least one audio stream, which may be received via the microphone 206 in the handsfree device 101, for occurrence of the at least one keyword. Upon recognition of the at least one keyword, the keyword recognition module 202 may be operable to establish the first connection 220 between the keyword recognition module 202 and the keyword service module 232 in the data processing device 102. The keyword service module 232 may then launch the voice interface module 234 in the data processing device 102, after the establishment of the first connection 220. The keyword recognition module 202 may be operable to send audio data, which may be received via the microphone 206 after the recognition of the at least one keyword, to the voice interface module 234 via the established first connection 220. The voice interface module 234 may then respond to the sent audio data for voice interface operations. In this regard, the keyword recognition module 202 may be operable to buffer, for example, in the memory 210, the audio data to be sent to the voice interface module 234, during a time interval corresponding to establishing the first connection 220.

During a keyword configuration operation for enabling the handsfree device 101 to recognize the at least one keyword, the processor 208 in the handsfree device 101 may be operable to send the at least one keyword, which may be inputted or spoken by the user 103 via the microphone 206, to the data processing device 102. The processor 238 in the data processing device 102 may then pass the received at least one keyword inputted by the user 103 to the voice interface module 234. The voice interface module 234 may record the at least one keyword inputted by the user 103. The keyword configuration module 204 may then be operable to receive, via the second connection 230, the recorded at least one keyword from the voice interface module 234. The keyword configuration module 204 may then be operable to perform configuration of the keyword recognition module 202, utilizing the recorded at least one keyword, for the keyword recognition module 202 to recognize the at least one keyword in the at least one received audio stream. In this regard, the keyword configuration module 204 may convert the recorded at least one keyword to a form required by the keyword recognition module 202, for example.

In an example embodiment of the disclosure, the handsfree device 101 may be operable to enter the keyword configuration operation in instances when the data processing device 102 receives a request for keyword configuration from the user 103 via the user interface module 236, and the voice interface module 234 causes the handsfree device 101 to enter the keyword configuration operation based on the request received from the user 103. For example, the voice interface module 234 may cause the handsfree device 101 to enter the keyword configuration operation by commanding or ordering the handsfree device 101 to start sending audio data, such as the at least one keyword, to the data processing device 102.

The handsfree device 101 may also be operable to enter the keyword configuration operation in instances when the handsfree device 101 is first coupled or connected to the data processing device 102, the processor 238 in the data processing device 102 discovers that the handsfree device 101 is capable of monitoring the at least one received audio stream for occurrence of the at least one keyword, the processor 238 determines that the handsfree device 101 has not been configured to recognize the at least one keyword, and the processor 238 causes the handsfree device 101 to enter the keyword configuration operation by prompting and requesting the user 103, via the user interface module 236, to input or speak the at least one keyword via the microphone 206 in the handsfree device 101. In this regard, the processor 238 may communicate or connect to the keyword configuration module 204 to query whether the keyword recognition module 202 has been configured. In instances when the keyword configuration module 204 reports back that the keyword recognition module 202 has not been configured, the processor 238 may determine that the handsfree device 101 has not been configured to recognize the at least one keyword. In instances when the processor 238 determines that the handsfree device 101 has been configured to recognize the at least one keyword, the processor 238 may enable a keyword configuration interface to allow the user 103 to record the at least one keyword via the keyword configuration operation, without requesting the user 103 to input or speak the at least one keyword via the microphone 206 in the handsfree device 101.

In an example embodiment of the disclosure, the voice interface module 234 may store or retain the recorded at least one keyword, for example, in the memory 240, to allow the user 103 to reuse the stored at least one keyword in a subsequent keyword configuration operation. In such instances, the user 103 may switch back to a previously used keyword without having to record the keyword from scratch. Before sending the recorded at least one keyword to the keyword configuration module 204 in the handsfree device 101, via the second connection 230, for keyword configuration, the voice interface module 234 may replay the recorded at least one keyword for the user 103 to review. The user 103 may listen to or review the recorded at least one keywords via the speaker 212 in the handsfree device 101. As a result of reviewing the recorded at least one keyword by the user 103, the data processing device 102 may receive an indication communicated or received from the user 103 via the user interface module 236. The indication may comprise, for example, acceptance of the recorded at least one keyword, rejection of the recorded at least one keyword, or cancellation of the keyword configuration operation.

In another example embodiment of the disclosure, the handsfree device 101 may comprise the at least one keyword which may be hard-coded into the handsfree device 101, for example, hard-coded in the memory 210, in a factory environment. The handsfree device 101 may also comprise, for example, at least one accent version of each of the at least one keyword, where the at least one accent version of each of the at least one keyword may be hard-coded into the handsfree device 101, for example, hard-coded in the memory 210, in a factory environment. In this regard, during a keyword configuration operation, the user 103 may be allowed to choose, for example, based on an accent of the user 103, at least one new keyword from among the at least one accent version of each of the at least one keyword. For example, the user 103 may choose at least one new keyword that may match his/her accent.

The handsfree device 101 may also comprise at least one version of each of the at least one keyword, where the at least one version of each of the at least one keyword may be hard-coded into the handsfree device 101, for example, hard-coded in the memory 210, in a factory environment, and the at least one version may correspond to at least one device type of the data processing device 102 respectively. In this regard, during a keyword configuration operation, the user 103 may be allowed to choose, for example, based on a device type of the data processing device 102, at least one new keyword from among the at least one version of each of the at least one keyword. For example, in instances when the data processing device 102 is a smart phone, the user 103 may choose a keyword version which comprises "phone". In instances when the data processing device 102 is a tablet, the user 103 may choose a keyword version which comprises "tablet".

Figure 3:
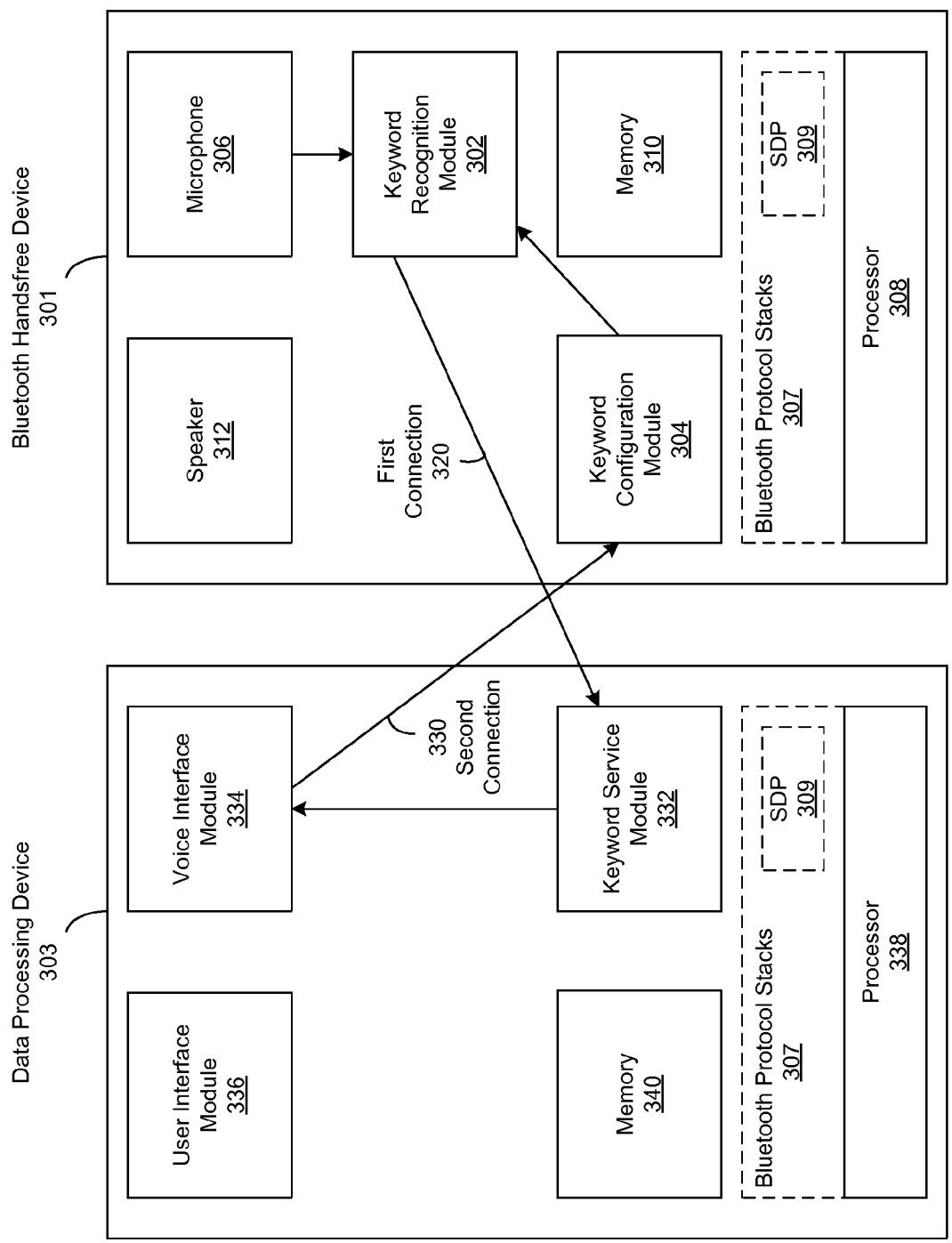
FIG. 3 is a block diagram illustrating an example Bluetooth handsfree device with continuous keyword recognition, in accordance with an embodiment of the disclosure.

FIG. 3 is a block diagram illustrating an example Bluetooth handsfree device with continuous keyword recognition, in accordance with an embodiment of the disclosure. Referring to FIG. 3, there is shown a Bluetooth handsfree device 301 and a data processing device 303. The Bluetooth handsfree device 301 may be coupled to the data processing device 302 via Bluetooth wireless communication. The Bluetooth handsfree device 301 may comprise a processor 308, a memory 310, a microphone 306, a speaker 312, a keyword recognition module 302 and a keyword configuration module 304. The data processing device 303 may comprise a processor 338, a memory 340, a voice interface module 334, a user interface module 336 and a keyword service module 332. In an example embodiment of the disclosure, the Bluetooth handsfree device 301 may comprise, for example, a Bluetooth headset. In such instances, the speaker 312 may comprise an earphone.

The processor 308 in the Bluetooth handsfree device 301 may comprise suitable logic, circuitry, interfaces and/or code that may be operable to manage and/or control operations of various components in the Bluetooth handsfree device 301 such as, for example, the microphone 306, the speaker 312, the keyword recognition module 302, the keyword configuration module 304 and/or other components. The processor 308 may utilize an operating system that enables the execution of various applications. The processor 308 may implement a plurality of Bluetooth protocol stacks 307 for communicating with the data processing device 303, for example.

The memory 310 in the Bluetooth handsfree device 301 may comprise suitable logic, circuitry, interfaces and/or code that may be operable to store information such as executable instructions and/or data that may be utilized by the processor 308, the keyword recognition module 302 and/or the keyword configuration module 304, for example. The memory 310 may comprise RAM, ROM, low latency nonvolatile memory such as flash memory and/or other suitable electronic data storage.

The microphone 306 in the Bluetooth handsfree device 301 may comprise suitable logic, circuitry, interfaces and/or code that may be operable to convert audio waves into electrical signals. The microphone 306, along with the speaker 312, may enable a user such as the user 103 to participate in a voice conversation, to provide audio commands and/or to receive audio feedbacks.

The speaker 312 in the Bluetooth handsfree device 301 may comprise suitable logic, circuitry, interfaces and/or code that may be operable to convert electrical signals into audio waves. The speaker 312, along with the microphone 306, may enable a user such as the user 103 to participate in a voice conversation, to provide audio commands and/or to receive audio feedbacks.

The keyword recognition module 302 in the Bluetooth handsfree device 301 may comprise suitable logic, circuitry, interfaces and/or code that may be operable to provide keyword recognition functions for the Bluetooth handsfree device 301. In an example embodiment of the disclosure, the keyword recognition module 302 may be operable to recognize at least one keyword which may be inputted or spoken by a user such as the user 103 via the microphone 306. Upon recognition of the at least one keyword, the keyword recognition module 302 may be operable to establish a first connection 320 between the keyword recognition module 302 and the keyword service module 332 in the data processing device 303 for voice interface operations. The keyword recognition module 302 may then transmit audio data, which may be received after the recognition of the at least one keyword, to the keyword service module 332, via the established first connection 320, for voice interface operations.

The keyword configuration module 304 in the Bluetooth handsfree device 301 may comprise suitable logic, circuitry, interfaces and/or code that may be operable to provide keyword configuration functions for the Bluetooth handsfree device 301. In an example embodiment of the disclosure, the keyword configuration module 304 may be operable to configure the keyword recognition module 302 with at least one keyword.

The processor 338 in the data processing device 303 may comprise suitable logic, circuitry, interfaces and/or code that may be operable to manage and/or control operations of various components in the data processing device 303 such as, for example, the voice interface module 334, the user interface module 336, the keyword service module 332 and/or other components. The processor 338 may utilize an operating system that enables the execution of various applications. The processor 338 may implement a plurality of Bluetooth protocol stacks 307 for communicating with the Bluetooth handsfree device 301, for example.

The memory 340 in the data processing device 303 may comprise suitable logic, circuitry, interfaces and/or code that may be operable to store information such as executable instructions and/or data that may be utilized by the processor 338, the voice interface module 334, the user interface module 336 and/or the keyword service module 332, for example. The memory 340 may comprise RAM, ROM, low latency nonvolatile memory such as flash memory and/or other suitable electronic data storage.

The voice interface module 334 in the data processing device 303 may comprise suitable logic, circuitry, interfaces and/or code that may be operable to provide voice interface functions for the data processing device 303. In an example embodiment of the disclosure, the voice interface module 334 may be activated or launched by the keyword service module 332 for voice interface operations, based on at least one keyword communicated from the Bluetooth handsfree device 301. During a keyword configuration operation in the Bluetooth handsfree device 301, the voice interface module 334 may be operable to record at least one keyword which may be received form a user such as the user 103 via the Bluetooth handsfree device 301. The voice interface module 334 may be operable to send or transmit the recorded at least one keyword to the keyword configuration module 304 in the Bluetooth handsfree device 301, via a second connection 330. The keyword configuration module 304 may then perform configuration of the keyword recognition module 302 utilizing the recorded at least one keyword.

The user interface module 336 in the data processing device 303 may comprise suitable logic, circuitry, interfaces and/or code that may be operable to provide user interface functions for the data processing device 303. During a keyword configuration operation in the Bluetooth handsfree device 301, the user interface module 336 may be operable to receive one or more requests for keyword configuration, from a user such as the user 103.

The keyword service module 332 in the data processing device 303 may comprise suitable logic, circuitry, interfaces and/or code that may be operable to launch or trigger the voice interface module 334 for voice interface operations. In an example embodiment of the disclosure, the keyword service module 332 may be operable to launch the voice interface module 334 in instances when the first connection 320 is established between the keyword service module 332 and the keyword recognition module 302 in the Bluetooth handsfree device 301. The keyword service module 332 may then be operable to pass audio data received via the first connection 320 to the voice interface module 334 for voice interface operations.

In operation, the keyword recognition module 302 in the Bluetooth handsfree device 301 may have been configured to recognize at least one keyword. The keyword recognition module 302 may be operable to monitor at least one audio stream, which may be received via the microphone 306 in the Bluetooth handsfree device 301, for occurrence of the at least one keyword. Upon recognition of the at least one keyword, the keyword recognition module 302 may be operable to establish the first connection 320 between the keyword recognition module 302 and the keyword service module 332 in the data processing device 303. The keyword service module 332 may then launch the voice interface module 334 in the data processing device 303, after the establishment of the first connection 320. The keyword recognition module 302 may be operable to send audio data, which may be received via the microphone 306 after the recognition of the at least one keyword, to the voice interface module 334 via the established first connection 320. The voice interface module 334 may then respond to the sent audio data for voice interface operations. In this regard, the keyword recognition module 302 may be operable to buffer, for example, in the memory 310, the audio data to be sent to the voice interface module 334, during a time interval corresponding to establishing the first connection 320.

During a keyword configuration operation for enabling the Bluetooth handsfree device 301 to recognize the at least one keyword, the processor 308 in the Bluetooth handsfree device 301 may be operable to send the at least one keyword, which may be inputted or spoken by the user 103 via the microphone 306, to the data processing device 303. The processor 338 in the data processing device 303 may then pass the received at least one keyword inputted by the user 103 to the voice interface module 334. The voice interface module 334 may record the at least one keyword inputted by the user 103. The keyword configuration module 304 may then be operable to receive, via the second connection 330, the recorded at least one keyword from the voice interface module 334. The keyword configuration module 304 may then be operable to perform configuration of the keyword recognition module 302, utilizing the recorded at least one keyword, for the keyword recognition module 302 to recognize the at least one keyword in the at least one received audio stream. In this regard, the keyword configuration module 304 may convert the recorded at least one keyword to a form required by the keyword recognition module 302, for example.

In an example embodiment of the disclosure, the Bluetooth handsfree device 301 may be operable to enter the keyword configuration operation in instances when the data processing device 303 receives a request for keyword configuration from the user 103 via the user interface module 336, and the voice interface module 334 causes the Bluetooth handsfree device 301 to enter the keyword configuration operation based on the request received from the user 103. For example, the voice interface module 334 may cause the Bluetooth handsfree device 301 to enter the keyword configuration operation by commanding or ordering the Bluetooth handsfree device 301 to start sending audio data, such as the at least one keyword, to the data processing device 303.

The Bluetooth handsfree device 301 may also be operable to enter the keyword configuration operation in instances when the Bluetooth handsfree device 301 is first coupled or connected to the data processing device 303, the processor 338 in the data processing device 303 discovers that the Bluetooth handsfree device 301 is capable of monitoring the at least one received audio stream for occurrence of the at least one keyword, the processor 338 determines that the Bluetooth handsfree device 301 has not been configured to recognize the at least one keyword, and the processor 338 causes the Bluetooth handsfree device 301 to enter the keyword configuration operation by prompting and requesting the user 103, via the user interface module 336, to input or speak the at least one keyword via the microphone 306 in the Bluetooth handsfree device 301. In this regard, the processor 338 may utilize a Bluetooth service discovery protocol (SDP) 309, in the Bluetooth protocol stacks 307, to discover that the Bluetooth handsfree device 301 is capable of monitoring the at least one received audio stream for occurrence of the at least one keyword. The processor 338 may communicate or connect to the keyword configuration module 304 to query whether the keyword recognition module 302 has been configured. In instances when the keyword configuration module 304 reports back that the keyword recognition module 302 has not been configured, the processor 338 may determine that the Bluetooth handsfree device 301 has not been configured to recognize the at least one keyword. In instances when the processor 338 determines that the Bluetooth handsfree device 301 has been configured to recognize the at least one keyword, the processor 338 may enable a keyword configuration interface to allow the user 103 to record the at least one keyword via the keyword configuration operation, without requesting the user 103 to input or speak the at least one keyword via the microphone 306 in the Bluetooth handsfree device 301.

In an example embodiment of the disclosure, the voice interface module 334 may store or retain the recorded at least one keyword, for example, in the memory 340, to allow the user 103 to reuse the stored at least one keyword in a subsequent keyword configuration operation. In such instances, the user 103 may switch back to a previously used keyword without having to record the keyword from scratch. Before sending the recorded at least one keyword to the keyword configuration module 304 in the Bluetooth handsfree device 301, via the second connection 330, for keyword configuration, the voice interface module 334 may replay the recorded at least one keyword for the user 103 to review. The user 103 may listen to or review the recorded at least one keyword via the speaker 312 in the Bluetooth handsfree device 301. As a result of reviewing the recorded at least one keyword by the user 103, the data processing device 303 may receive an indication communicated or received from the user 103 via the user interface module 336. The indication may comprise, for example, acceptance of the recorded at least one keyword, rejection of the recorded at least one keyword, or cancellation of the keyword configuration operation.

In another example embodiment of the disclosure, the Bluetooth handsfree device 301 may comprise the at least one keyword which may be hard-coded into the Bluetooth handsfree device 301, for example, hard-coded in the memory 310, in a factory environment. The Bluetooth handsfree device 301 may also comprise, for example, at least one accent version of each of the at least one keyword, where the at least one accent version of each of the at least one keyword may be hard-coded into the Bluetooth handsfree device 301, for example, hard-coded in the memory 310, in a factory environment. In this regard, during a keyword configuration operation, the user 103 may be allowed to choose, for example, based on an accent of the user 103, at least one new keyword from among the at least one accent version of each of the at least one keyword. For example, the user 103 may choose at least one new keyword that may match or close to his/her accent.

The Bluetooth handsfree device 301 may also comprise at least one version of each of the at least one keyword, where the at least one version of each of the at least one keyword may be hard-coded into the Bluetooth handsfree device 301, for example, hard-coded in the memory 310, in a factory environment, and the at least one version may correspond to at least one device type respectively. In this regard, during a keyword configuration operation, the user 103 may be allowed to choose, for example, based on a device type of the data processing device 303, at least one new keyword from among the at least one version of each of the at least one keyword. For example, in instances when the data processing device 303 is a smart phone, the user 103 may choose a keyword version which comprises "phone". In instances when the data processing device 303 is a tablet, the user 103 may choose a keyword version which comprises "tablet".

Figure 4:
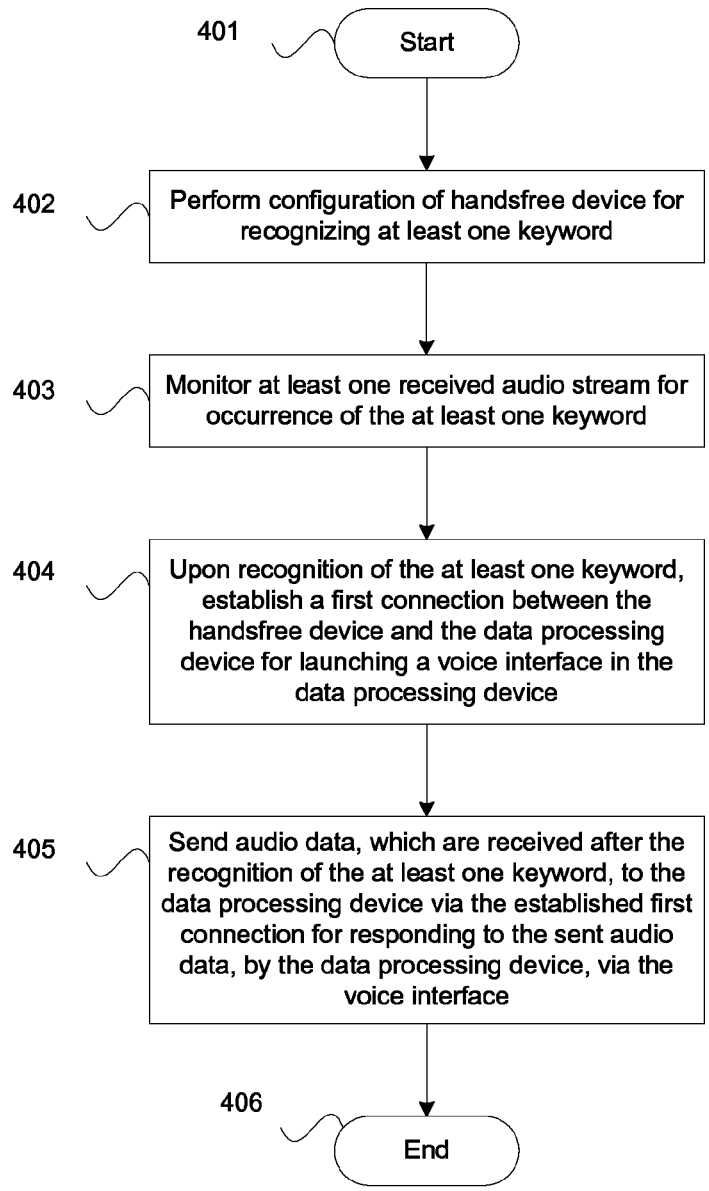
FIG. 4 is a flow chart illustrating example steps for handsfree device with continuous keyword recognition, in accordance with an embodiment of the disclosure.

FIG. 4 is a flow chart illustrating example steps for handsfree device with continuous keyword recognition, in accordance with an embodiment of the disclosure. Referring to FIG. 4, the example steps start at step 401. In step 402, the keyword configuration module 204 in the handsfree device 101 may be operable to perform configuration of the keyword recognition module 202 in the handsfree device 101 for recognizing at least one keyword by the keyword recognition module 202. In step 403, the keyword recognition module 202 in the handsfree device 101 may be operable to monitor at least one audio stream, which may be received via the microphone 206 in the handsfree device 101, for occurrence of the at least one keyword. In step 404, upon recognition of the at least one keyword, the keyword recognition module 202 in the handsfree device 101 may be operable to establish a first connection such as the first connection 220 between the keyword recognition module 202 and the keyword service module 232 in the data processing device 102 for launching a voice interface such as the voice interface module 234 in the data processing device 102. In step 405, the keyword recognition module 202 in the handsfree device 101 may be operable to send audio data, which may be received (e.g., via the microphone 206) after the recognition of the at least one keyword, to the voice interface module 234 in the data processing device 102 via the established first connection 220, for responding to the sent audio data, by the data processing device 102, via the voice interface module 234. The example steps may proceed to the end step 406.

Figure 5:
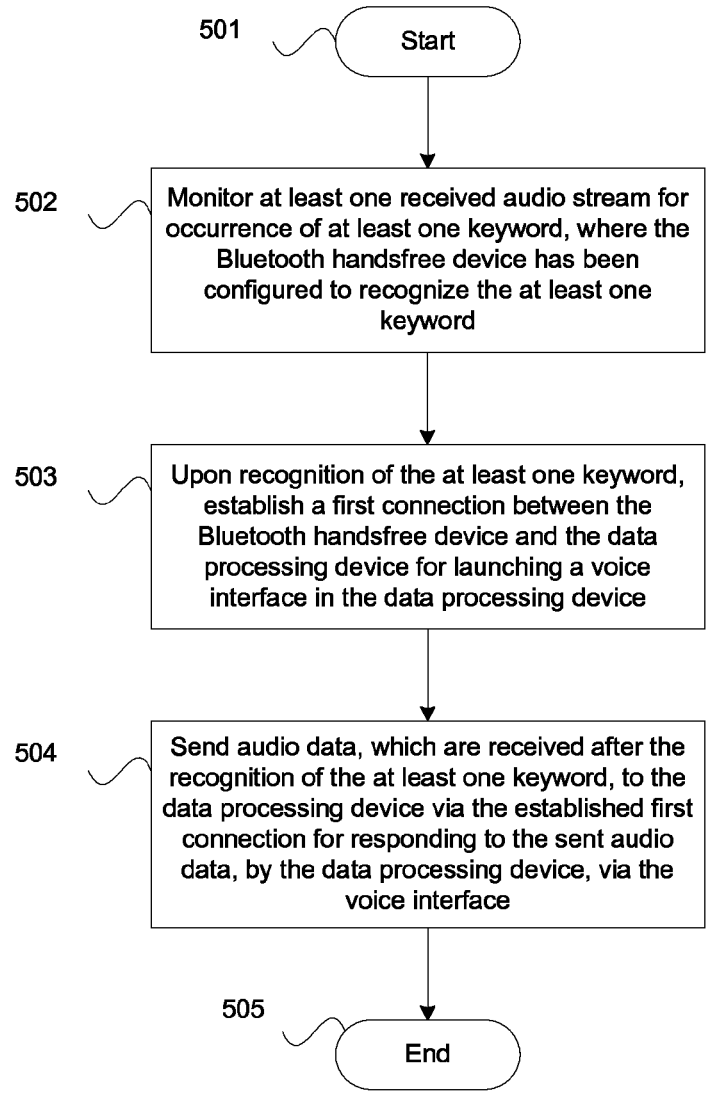
FIG. 5 is a flow chart illustrating example steps for Bluetooth handsfree device with continuous keyword recognition, in accordance with an embodiment of the disclosure.

FIG. 5 is a flow chart illustrating example steps for Bluetooth handsfree device with continuous keyword recognition, in accordance with an embodiment of the disclosure. Referring to FIG. 5, the example steps start at step 501. In step 502, the keyword recognition module 302 in the Bluetooth handsfree device 301 may be operable to monitor at least one audio stream, which may be received via the microphone 306 in the Bluetooth handsfree device 301, for occurrence of at least one keyword. In this regard, the keyword recognition module 302 in the Bluetooth handsfree device 301 may have been configured to recognize the at least one keyword. In step 503, upon recognition of the at least one keyword, the keyword recognition module 302 in the Bluetooth handsfree device 301 may be operable to establish a first connection such as the first connection 320 between the keyword recognition module 302 and the keyword service module 332 in the data processing device 303 for launching a voice interface such as the voice interface module 334 in the data processing device 303. In step 504, the keyword recognition module 302 in the Bluetooth handsfree device 301 may be operable to send audio data, which may be received (e.g. via the microphone 306) after the recognition of the at least one keyword, to the voice interface module 334 in the data processing device 303 via the established first connection 320, for responding to the sent audio data, by the data processing device 303, via the voice interface module 334. The example steps may proceed to the end step 505.

Figure 6:
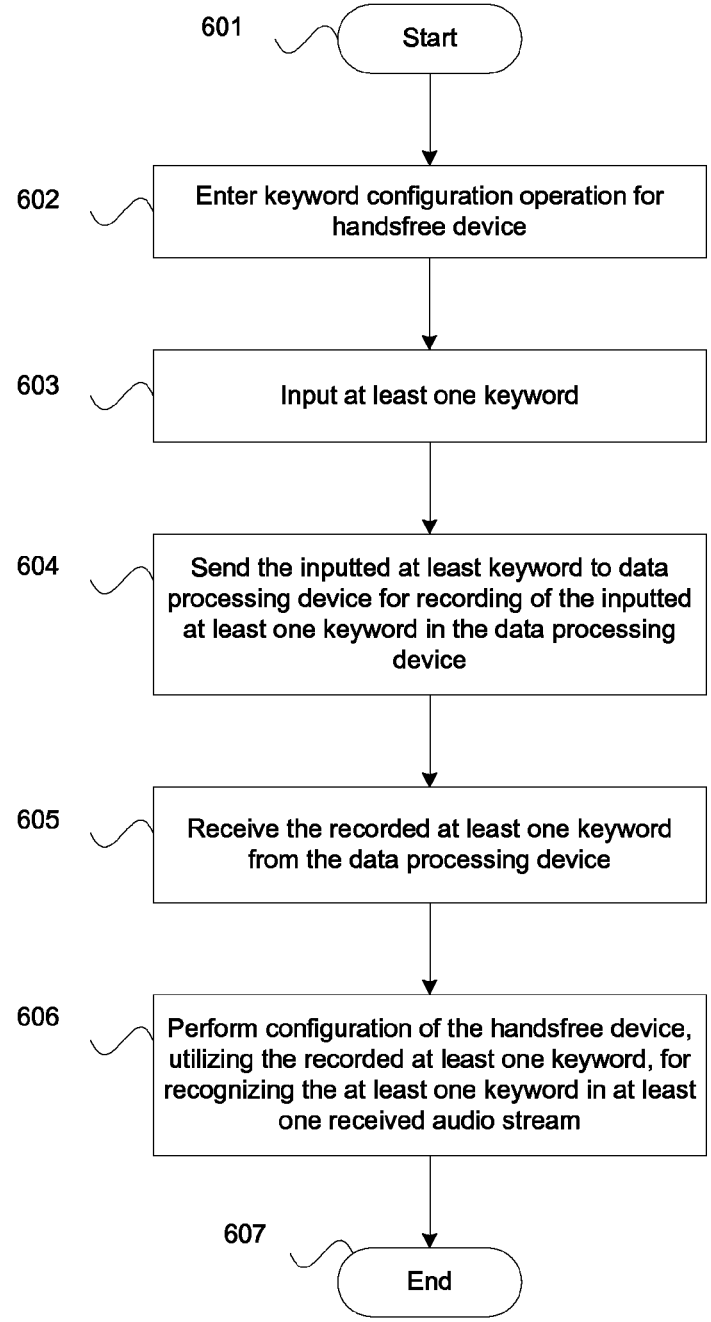
FIG. 6 is a flow chart illustrating example steps for keyword configuration of handsfree device, in accordance with an embodiment of the disclosure.

FIG. 6 is a flow chart illustrating example steps for keyword configuration of handsfree device, in accordance with an embodiment of the disclosure. Referring to FIG. 6, the example steps start at step 601. In step 602, the handsfree device 101 may be operable to enter a keyword configuration operation for the handsfree device 101. In this regard, the handsfree device 101 may enter the keyword configuration operation in instances when a coupled data processing device 102 receives a request for keyword configuration from a user 103 via a user interface module 236 in the data processing device 102, and a voice interface module 234 in the data processing device 102 causes the handsfree device 101 to enter the keyword configuration operation based on the request received from the user 103. The handsfree device 101 may also enter the keyword configuration operation in instances when the handsfree device 101 is first coupled or connected to the data processing device 102, a processor 238 in the data processing device 102 discovers that the handsfree device 101 is capable of monitoring at least one received audio stream for occurrence of at least one keyword, the processor 238 determines that the handsfree device 101 has not been configured to recognize the at least one keyword, and the processor 238 causes the handsfree device 101 to enter the keyword configuration operation by prompting and requesting the user 103, via the user interface module 236, to input or speak the at least one keyword in the handsfree device 101. In step 603, the handsfree device 101 may be operable to input at least one keyword via a microphone 206 in the handsfree device 101. In step 604, a processor 208 in the handsfree device 101 may be operable to send the inputted at least one keyword to the data processing device 102 for recording of the inputted at least one keyword by the voice interface module 234 in the data processing device 102. In step 605, a keyword configuration module 204 in the handsfree device 101 may then be operable to receive the recorded at least one keyword from the voice interface module 234 in the data processing device 102. In step 606, the keyword configuration module 204 in the handsfree device 101 may then be operable to perform configuration of a keyword recognition module 202 in the handsfree device 101, utilizing the recorded at least one keyword, for the keyword recognition module 202 to recognize the at least one keyword in the at least one received audio stream. The example steps may proceed to the end step 607.

Figure 7:
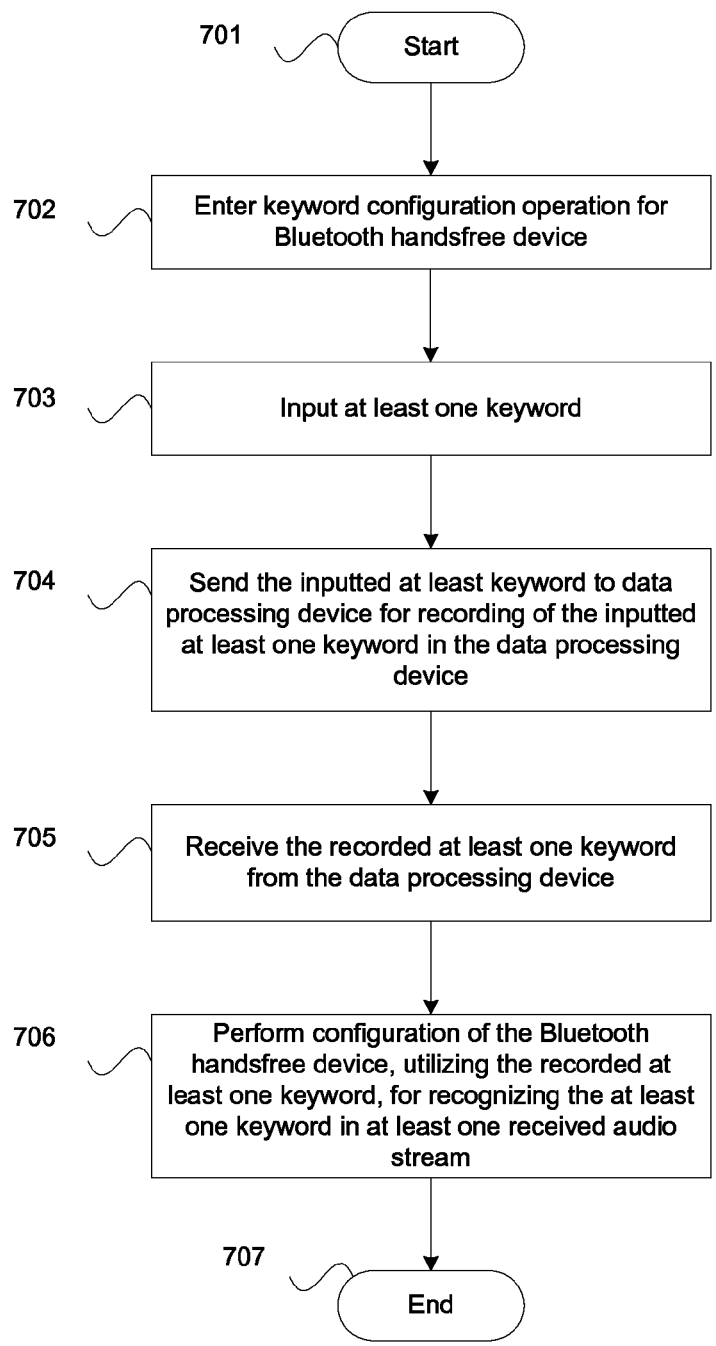
FIG. 7 is a flow chart illustrating example steps for keyword configuration of Bluetooth handsfree device, in accordance with an embodiment of the disclosure.

FIG. 7 is a flow chart illustrating example steps for keyword configuration of Bluetooth handsfree device, in accordance with an embodiment of the disclosure. Referring to FIG. 7, the example steps start at step 701. In step 702, the Bluetooth handsfree device 301 may be operable to enter a keyword configuration operation for the Bluetooth handsfree device 301. In this regard, the Bluetooth handsfree device 301 may enter the keyword configuration operation in instances when a coupled data processing device 303 receives a request for keyword configuration from a user 103 via a user interface module 336 in the data processing device 303, and a voice interface module 334 in the data processing device 303 causes the Bluetooth handsfree device 301 to enter the keyword configuration operation based on the request received from the user 103. The Bluetooth handsfree device 301 may also enter the keyword configuration operation in instances when the Bluetooth handsfree device 301 is first coupled or connected to the data processing device 303, a processor 338 in the data processing device 303 discovers (e.g., utilizing a Bluetooth service discovery protocol) that the Bluetooth handsfree device 301 is capable of monitoring at least one received audio stream for occurrence of at least one keyword, the processor 338 determines that the Bluetooth handsfree device 301 has not been configured to recognize the at least one keyword, and the processor 338 causes the Bluetooth handsfree device 301 to enter the keyword configuration operation by prompting and requesting the user 103, via the user interface module 336, to input or speak the at least one keyword in the Bluetooth handsfree device 301. In step 703, the Bluetooth handsfree device 301 may be operable to input at least one keyword via a microphone 306 in the Bluetooth handsfree device 301. In step 704, a processor 308 in the Bluetooth handsfree device 301 may be operable to send the inputted at least one keyword to the data processing device 303 for recording of the inputted at least one keyword by the voice interface module 334 in the data processing device 303. In step 705, a keyword configuration module 304 in the Bluetooth handsfree device 301 may then be operable to receive the recorded at least one keyword from the voice interface module 334 in the data processing device 303. In step 706, the keyword configuration module 304 in the Bluetooth handsfree device 301 may then be operable to perform configuration of a keyword recognition module 302 in the Bluetooth handsfree device 301, utilizing the recorded at least one keyword, for the keyword recognition module 302 to recognize the at least one keyword in the at least one received audio stream. The example steps may proceed to the end step 707.

FIG. 8 is a block diagram illustrating example scenarios of keyword hard-coded into handsfree device in a factory environment, in accordance with an embodiment of the disclosure. Referring to FIG. 8, there is shown the handsfree device 101 in a factory environment 801. The handsfree device 101 may be as described with respect to FIG. 2, for example.

In an example operation, the handsfree device 101 may comprise at least one keyword 802 which may be hard-coded into the handsfree device 101, for example, hard-coded in the memory 210, in the factory environment 801. The handsfree device 101 may also comprise, for example, at least one accent version 803 of each of the at least one keyword 802, where the at least one accent version 803 of each of the at least one keyword 802 may be hard-coded into the handsfree device 101, for example, hard-coded in the memory 210, in the factory environment 801. In this regard, during a keyword configuration operation of the handsfree device 101, a user such as the user 103 may be allowed to choose, for example, based on an accent of the user 103, at least one new keyword from among the at least one accent version 803 of each of the at least one keyword 802. For example, the user 103 may choose a new keyword that may match his/her accent.

The handsfree device 101 may also comprise at least one version 804 of each of the at least one keyword 802, where the at least one version 804 of each of the at least one keyword 802 may be hard-coded into the handsfree device 101, for example, hard-coded in the memory 210, in the factory environment 801, and the at least one version 804 may correspond to at least one device type of a data processing device such as the data processing device 102 respectively. In this regard, during a keyword configuration operation of the handsfree device 101, the user 103 may be allowed to choose, for example, based on a device type of the data processing device 102, at least one new keyword from among the at least one version 804 of each of the at least one keyword 802. For example, in instances when the data processing device 102 is a smart phone, the user 103 may choose a keyword version which comprises "phone". In instances when the data processing device 102 is a tablet, the user 103 may choose a keyword version which comprises "tablet".

In various embodiments of the disclosure, a handsfree device 101 may be coupled or connected to a data processing device 102. A keyword recognition module 202 in the handsfree device 101 may have been configured to recognize at least one keyword. The keyword recognition module 202 may be operable to monitor at least one audio stream, which may be received via a microphone 206 in the handsfree device 101, for occurrence of the at least one keyword. Upon recognition of the at least one keyword, the keyword recognition module 202 may be operable to establish a first connection 220 between the keyword recognition module 202 and a keyword service module 232 in the data processing device 102 for launching a voice interface module 234 by the keyword service module 232 in the data processing device 102. The keyword recognition module 202 may be operable to send audio data, which may be received via the microphone 206 after the recognition of the at least one keyword, to the voice interface module 234 via the established first connection 220 for responding to the sent audio data, by the data processing device 102, via the voice interface module 234. In this regard, the keyword recognition module 202 may be operable to buffer, for example, in a memory 210 in the handsfree device 101, the audio data to be sent to the voice interface module 234, during a time interval corresponding to establishing the first connection 220.

During a keyword configuration operation for enabling the handsfree device 101 to recognize the at least one keyword, the handsfree device 101 may be operable to input the at least one keyword via a microphone 206 in the handsfree device 101. The handsfree device 101 may be operable to send the inputted at least one keyword to the data processing device 102 for recording, by the voice interface module 234 in the data processing device 102, of the inputted at least one keyword. A keyword configuration module 204 in the handsfree device 101 may then be operable to receive, via a second connection 230, the recorded at least one keyword from the voice interface module 234. The keyword configuration module 204 may then be operable to perform configuration of the keyword recognition module 202, utilizing the recorded at least one keyword, for the keyword recognition module 202 to recognize the at least one keyword in the at least one received audio stream.

In an example embodiment of the disclosure, the handsfree device 101 may be operable to enter the keyword configuration operation in instances when the data processing device 102 receives a request for keyword configuration, and the voice interface module 234 causes the handsfree device 101 to enter the keyword configuration operation based on the received request.

The handsfree device 101 may also be operable to enter the keyword configuration operation in instances when the handsfree device 101 is first coupled or connected to the data processing device 102, the data processing device 102 discovers that the handsfree device 101 is capable of monitoring the at least one received audio stream for occurrence of the at least one keyword, the data processing device 102 determines that the handsfree device 101 has not been configured to recognize the at least one keyword, and the data processing device 102 causes the handsfree device 101 to enter the keyword configuration operation by prompting and requesting input of the at least one keyword via the microphone 206 in the handsfree device 101. In instances when the data processing device 102 determines that the handsfree device 101 has been configured to recognize the at least one keyword, the data processing device 102 may enable a keyword configuration interface to allow recording of the at least one keyword via the keyword configuration operation, without requesting the input of the at least one keyword via the microphone 206 in the handsfree device 101.

In an example embodiment of the disclosure, the voice interface module 234 in the data processing device 102 may store or retain the recorded at least one keyword, for example, in a memory 240 in the data processing device 102, to allow reuse of the stored at least one keyword in a subsequent keyword configuration operation. Before sending the recorded at least one keyword to the keyword configuration module 204 in the handsfree device 101, via the second connection 230, for keyword configuration, the voice interface module 234 in the data processing device 102 may replay the recorded at least one keyword for review. As a result of the review of the recorded at least one keyword, the data processing device 102 may receive an indication via the user interface module 236, for example. The indication may comprise, for example, acceptance of the recorded at least one keyword, rejection of the recorded at least one keyword or cancellation of the keyword configuration operation.

In another example embodiment of the disclosure, the handsfree device 101 may comprise the at least one keyword 802 which may be hard-coded into the handsfree device 101, for example, hard-coded in the memory 210, in a factory environment 801. The handsfree device 101 may also comprise, for example, at least one accent version 803 of each of the at least one keyword 802, where the at least one accent version 803 of each of the at least one keyword 802 may be hard-coded into the handsfree device 101, for example, hard-coded in the memory 210, in a factory environment 801. In this regard, during a keyword configuration operation, at least one new keyword may be allowed to be chosen from among the at least one accent version 803 of each of the at least one keyword 802.

The handsfree device 101 may also comprise at least one version 804 of each of the at least one keyword 802, where the at least one version 804 of each of the at least one keyword 802 may be hard-coded into the handsfree device 101, for example, hard-coded in the memory 210, in a factory environment 801, and the at least one version 804 may correspond to at least one device type of the data processing device 102 respectively. In this regard, during a keyword configuration operation, at least one new keyword may be allowed to be chosen from among the at least one version 804 of each of the at least one keyword 802.

In some embodiments of the disclosure, the handsfree device 101 may comprise a Bluetooth handsfree device 301. The Bluetooth handsfree device 301 may be coupled to a data processing device 303 via Bluetooth communication. A keyword recognition module 302 in the Bluetooth handsfree device 301 may have been configured to recognize at least one keyword. In such instances, the keyword recognition module 302 may be operable to monitor at least one audio stream, which may be received via a microphone 306 in the Bluetooth handsfree device 301, for occurrence of the at least one keyword. Upon recognition of the at least one keyword, the keyword recognition module 302 may be operable to establish a first connection 320 between the keyword recognition module 302 and a keyword service module 332 in the data processing device 303 for launching a voice interface module 334 by the keyword service module 332 in the data processing device 303. The keyword recognition module 302 may be operable to send audio data, which may be received via the microphone 306 after the recognition of the at least one keyword, to the voice interface module 334 via the established first connection 320 for responding to the sent audio data, by the data processing device 303, via the voice interface module 334.

During a keyword configuration operation for enabling the Bluetooth handsfree device 301 to recognize the at least one keyword, the Bluetooth handsfree device 301 may be operable to input the at least one keyword via a microphone 306 in the Bluetooth handsfree device 301. The Bluetooth handsfree device 301 may be operable to send the inputted at least one keyword to the data processing device 303 for recording, by the voice interface module 334 in the data processing device 303, of the inputted at least one keyword. A keyword configuration module 304 in the Bluetooth handsfree device 301 may then be operable to receive, via a second connection 330, the recorded at least one keyword from the voice interface module 334. The keyword configuration module 304 may then be operable to perform configuration of the keyword recognition module 302, utilizing the recorded at least one keyword, for the keyword recognition module 302 to recognize the at least one keyword in the at least one received audio stream.

The Bluetooth handsfree device 301 may be operable to enter the keyword configuration operation in instances when the Bluetooth handsfree device 301 is first coupled or connected to the data processing device 303, the data processing device 303 discovers that the Bluetooth handsfree device 301 is capable of monitoring the at least one received audio stream for occurrence of the at least one keyword, the data processing device 303 determines that the Bluetooth handsfree device 301 has not been configured to recognize the at least one keyword, and the data processing device 303 causes the Bluetooth handsfree device 301 to enter the keyword configuration operation by prompting and requesting input of the at least one keyword via the microphone 306 in the Bluetooth handsfree device 301. In this regard, a processor 338 in the data processing device 303 may utilize a Bluetooth service discovery protocol (SDP) 309 to discover that the Bluetooth handsfree device 301 is capable of monitoring the at least one received audio stream for occurrence of the at least one keyword.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for handsfree device with continuous keyword recognition.

Accordingly, aspects of the present disclosure may be realized in hardware, software, or a combination of hardware and software. Aspects of the present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A computer-implemented method comprising:
   receiving, by a handsfree device that is paired with a separate, mobile communications device, first audio data;
   determining, by a speech recognizer implemented on the handsfree device, that the first audio data includes one or more particular keywords;
   after determining that the first audio data includes one or more particular keywords, initiating, by the handsfree device, establishment of an active communication channel between the handsfree device and the mobile communication device; and
   transmitting stored second audio data received after establishment of an active communication channel between the handsfree device and the mobile communication device and stored in a buffer on the handsfree device over the active communication channel to the mobile communication device.

2. The method of claim 1, wherein initiating establishment of an active communication channel between the handsfree device and the mobile communication device comprises transmitting at least a portion of the first audio data through the communications channel to the mobile communication device.

3. The method of claim 1, wherein determining that the first audio data includes one or more particular keywords comprises determining that the first audio data includes one or more keywords that are hard-coded in a memory of the handsfree device.

4. The method of claim 1, wherein determining that the first audio data includes one or more particular keywords comprises determining that the first audio data includes one or more user-defined keywords.

5. The method of claim 1, wherein determining that the first audio data includes one or more particular keywords comprises determining that the first audio data includes one or more keywords that are associated with one or more voice commands.

6. The method of claim 1, wherein determining that the first audio data includes one or more particular keywords comprises determining that the first audio data includes a hotword.

7. The method of claim 1, comprising performing, by the speech recognizer implemented on the handsfree device, speech recognition on the first audio data.

8. The method of claim 1, wherein the speech recognizer implemented on the handsfree device comprises a continuous speech recognizer.

9. A computer-readable storage device storing software comprising instructions executable by one or more computers which, upon such execution, cause the one or more computers to perform operations comprising:
   receiving, by a handsfree device that is paired with a separate, mobile communications device, first audio data;
   determining, by a speech recognizer implemented on the handsfree device, that the first audio data includes one or more particular keywords;
   after determining that the first audio data includes one or more particular keywords, initiating, by the handsfree device, establishment of an active communication channel between the handsfree device and the mobile communication device;
   after initiating establishment of an active communication channel between the handsfree device and the mobile communication device, receiving, by the handsfree device, second audio data;
   storing the second audio data in a buffer on the handsfree device;
   determining that the active communication channel between the handsfree device and the mobile communication device has been established; and
   after determining that the active communication channel between the handsfree device and the mobile communication device has been established, transmitting the stored second audio data over the active communication channel to the mobile communication device.

10. The device of claim 9, wherein initiating establishment of an active communication channel between the handsfree device and the mobile communication device comprises transmitting at least a portion of the first audio data through the communications channel to the mobile communication device.

11. The device of claim 9, wherein determining that the first audio data includes one or more particular keywords comprises determining that the first audio data includes one or more keywords that are hard-coded in a memory of the handsfree device.

12. The device of claim 9, wherein determining that the first audio data includes one or more particular keywords comprises determining that the first audio data includes one or more user-defined keywords.

13. The device of claim 9, wherein determining that the first audio data includes one or more particular keywords comprises determining that the first audio data includes one or more keywords that are associated with one or more voice commands.

14. The device of claim 9, wherein determining that the first audio data includes one or more particular keywords comprises determining that the first audio data includes a hotword.

15. The device of claim 9, comprising performing, by the speech recognizer implemented on the handsfree device, speech recognition on the first audio data.

16. The device of claim 9, wherein the speech recognizer implemented on the handsfree device comprises a continuous speech recognizer.

17. A system comprising:
one or more computers; and
a computer-readable medium tangibly embodying a computer program product comprising instructions to cause the one or more computers to perform operations comprising:
receiving, by a handsfree device that is paired with a separate, mobile communications device, first audio data;
determining, by a speech recognizer implemented on the handsfree device, that the first audio data includes one or more particular keywords;
after determining that the first audio data includes one or more particular keywords, initiating, by the handsfree device, establishment of an active communication channel between the handsfree device and the mobile communication device;
after initiating establishment of an active communication channel between the handsfree device and the mobile communication device, receiving, by the handsfree device, second audio data;
storing the second audio data in a buffer on the handsfree device;
determining that the active communication channel between the handsfree device and the mobile communication device has been established; and
after determining that the active communication channel between the handsfree device and the mobile communication device has been established, transmitting the stored second audio data over the active communication channel to the mobile communication device.

18. The system of claim 17, wherein initiating establishment of an active communication channel between the handsfree device and the mobile communication device comprises transmitting at least a portion of the first audio data through the communications channel to the mobile communication device.

19. The system of claim 17, wherein determining that the first audio data includes one or more particular keywords comprises determining that the first audio data includes one or more keywords that are hard-coded in a memory of the handsfree device.

20. The system of claim 17, wherein determining that the first audio data includes one or more particular keywords comprises determining that the first audio data includes one or more user-defined keywords.

\* \* \* \* \*